(12) United States Patent
Lord et al.

(10) Patent No.: US 8,909,924 B2
(45) Date of Patent: Dec. 9, 2014

(54) DIGITAL ASSET MANAGEMENT SYSTEM

(75) Inventors: Steven Earl Lord, San Gabriel, CA (US); Victor Eduardo Contin, Stevenson Ranch, CA (US); Jay Stuart Tsuruda, Pasadena, CA (US); Kevin James Vandereaux Jones, Pasadena, CA (US)

(73) Assignee: Dapict, Inc.

( * ) Notice: Subject to any disclaimer, the term of this patent is extended or adjusted under 35 U.S.C. 154(b) by 927 days.

(21) Appl. No.: 11/948,775

(22) Filed: Nov. 30, 2007

(65) Prior Publication Data

US 2008/0162931 A1 Jul. 3, 2008

Related U.S. Application Data

(60) Provisional application No. 60/872,376, filed on Nov. 30, 2006.

(51) Int. Cl.
*H04L 29/06* (2006.01)
*H04L 9/08* (2006.01)
*H04L 9/32* (2006.01)

(52) U.S. Cl.
CPC .. *H04L 9/08* (2013.01); *H04L 9/32* (2013.01); *H04L 63/061* (2013.01); *H04L 63/10* (2013.01); *H04L 2463/062* (2013.01)
USPC .......................................... 713/165; 726/27

(58) Field of Classification Search
CPC ......... H04L 63/10; H04L 63/108; H04L 9/32; H04L 63/061; H04L 2463/062; G06F 21/602; G06F 21/604; G06F 2221/2151
USPC .......... 713/165, 167, 168, 171; 726/2, 27–29; 380/200
See application file for complete search history.

(56) References Cited

U.S. PATENT DOCUMENTS

| | | | | |
|---|---|---|---|---|
| 6,523,117 | B2 * | 2/2003 | Oki et al. | 713/189 |
| 6,961,849 | B1 * | 11/2005 | Davis et al. | 713/167 |
| 7,114,081 | B2 * | 9/2006 | Watanabe et al. | 713/189 |
| 7,434,048 | B1 * | 10/2008 | Shapiro et al. | 713/165 |
| 7,493,499 | B1 * | 2/2009 | Deaver et al. | 713/193 |
| 7,523,411 | B2 * | 4/2009 | Carlin | 715/782 |
| 7,780,528 | B2 * | 8/2010 | Hirayama | 463/40 |
| 2001/0036272 | A1 * | 11/2001 | Hirayama | 380/240 |
| 2001/0044894 | A1 * | 11/2001 | Saito et al. | 713/156 |
| 2003/0088517 | A1 * | 5/2003 | Medoff | 705/59 |

(Continued)

*Primary Examiner* — Eleni Shiferaw
*Assistant Examiner* — Jing Sims
(74) *Attorney, Agent, or Firm* — Mark Young, P.A.

(57) ABSTRACT

Access to a digital asset by a user may be controlled by encrypting the digital asset, embedding the encrypted digital asset in a file, providing a file viewer to the user, responding to a request by the user to access the digital asset by sending a request from the file viewer to a server, the request including identification information related to the user and the file, processing the request from the file viewer, with information in a database related to authorization of the user to access the digital asset, to produce and send to the viewer an encrypted authorization key and responding to receipt of the encrypted authorization key by the viewer by decrypting the authorization key to permit the requested access to the digital asset via the file viewer.

16 Claims, 14 Drawing Sheets

(56) References Cited

U.S. PATENT DOCUMENTS

| | | | |
|---|---|---|---|
| 2006/0048229 A1* | 3/2006 | Bronstein | 726/25 |
| 2006/0139353 A1* | 6/2006 | Washio | 345/467 |
| 2006/0277607 A1* | 12/2006 | Chung | 726/27 |
| 2007/0006322 A1* | 1/2007 | Karimzadeh et al. | 726/27 |
| 2007/0162749 A1* | 7/2007 | Lim | 713/167 |
| 2007/0192798 A1* | 8/2007 | Morgan | 725/51 |
| 2008/0066185 A1* | 3/2008 | Lester et al. | 726/27 |
| 2008/0086779 A1* | 4/2008 | Blake et al. | 726/27 |

* cited by examiner

Document Management Screen Shot
52

Document Detail Management
Screen Shot 56

User Report

62

User Johanas Smythe
Machine: JS1
External IP: XX.80.8.130
Internal IP: 10.10.11.50
MAC: XXX72716700

LOGIN_OK Time: 2006-11-10 16:29:07.030
| | | |
|---|---|---|
| Blue hills.dpt | DRP_ASSET_REQ_OK | 2006-11-10 16:29:07.483 |
| Blue hills.dpt | ASSET_OPENED_OK | 2006-11-10 16:29:08.030 |
| sequence_diagram.dpt | DRP_ASSET_REQ_OK | 2006-11-10 16:29:48.627 |
| sequence_diagram.dpt | ASSET_OPENED_OK | 2006-11-10 16:29:56.767 |
| ES Modified.dpt | DRP_ASSET_REQ_OK | 2006-11-10 16:31:49.983 |

LOGIN_OK Time: 2006-11-10 16:33:27.157
| | | |
|---|---|---|
| ES Modified.dpt | DRP_ASSET_REQ_OK | 2006-11-10 16:33:27.563 |
| ES Modified.dpt | ASSET_OPENED_OK | 2006-11-10 16:33:35.827 |
| POC DB Schema.dpt | DRP_ASSET_REQ_OK | 2006-11-10 16:34:52.373 |
| POC DB Schema.dpt | ASSET_OPENED_OK | 2006-11-10 16:34:52.810 |
| ES Modified.dpt | DRP_ASSET_REQ_OK | 2006-11-10 16:38:29.827 |
| ES Modified.dpt | ASSET_OPENED_OK | 2006-11-10 16:38:33.560 |
| sequence_diagram.dpt | DRP_ASSET_REQ_OK | 2006-11-10 16:39:30.543 |
| sequence_diagram.dpt | ASSET_OPENED_OK | 2006-11-10 16:39:34.277 |

FIG. 12

Details of obscured view, made visible when permission granted by creator.

Example of "My Space" web page, which has been wrapped and presented using DaPict system. Examples of obscured views of images are illustrated. Views of images are obscured until permission is granted by creator.

DIGITAL ASSET MANAGEMENT SYSTEM

CROSS REFERENCE TO RELATED APPLICATIONS

This application claims the priority of U.S. provisional patent application Ser. No. 60/872,376 filed Nov. 30, 2006. This provisional application is incorporated herein in its entirety and is attached hereto as Appendix A.

BACKGROUND OF THE INVENTION

1. Field of the Invention

This invention relates to digital asset management and in particular to techniques for the control and tracking of copies of digital assets such as computer files.

2. Description of the Prior Art

Various approaches for the management of digital assets have been attempted, but have limitations regarding the protection afforded the files and the ease of authorized distribution and use. What is needed is an improved technique without such limitations.

SUMMARY OF THE DISCLOSURE

A method for controlling access to a digital asset by a user may include encrypting the digital asset, embedding the encrypted digital asset in a file, providing a file viewer to the user, responding to a request by the user to access the digital asset by sending a request from the file viewer to a server, the request including identification information related to the user and the file, processing the request from the file viewer, with information in a database related to authorization of the user to access the digital asset, to produce and send to the viewer an encrypted authorization key and responding to receipt of the encrypted authorization key by the viewer by decrypting the authorization key to permit the requested access to the digital asset via the file viewer.

BRIEF DESCRIPTION OF THE DRAWINGS

FIG. 6 is a rendering of screen shot of a Data Management System web user's picture management screen.

FIG. 7 is a rendering of screen shot of a Data Management System web user's document management screen.

FIG. 12 is an exemplary user report.

DETAILED DISCLOSURE OF THE PREFERRED EMBODIMENT(S)

Figure 1:
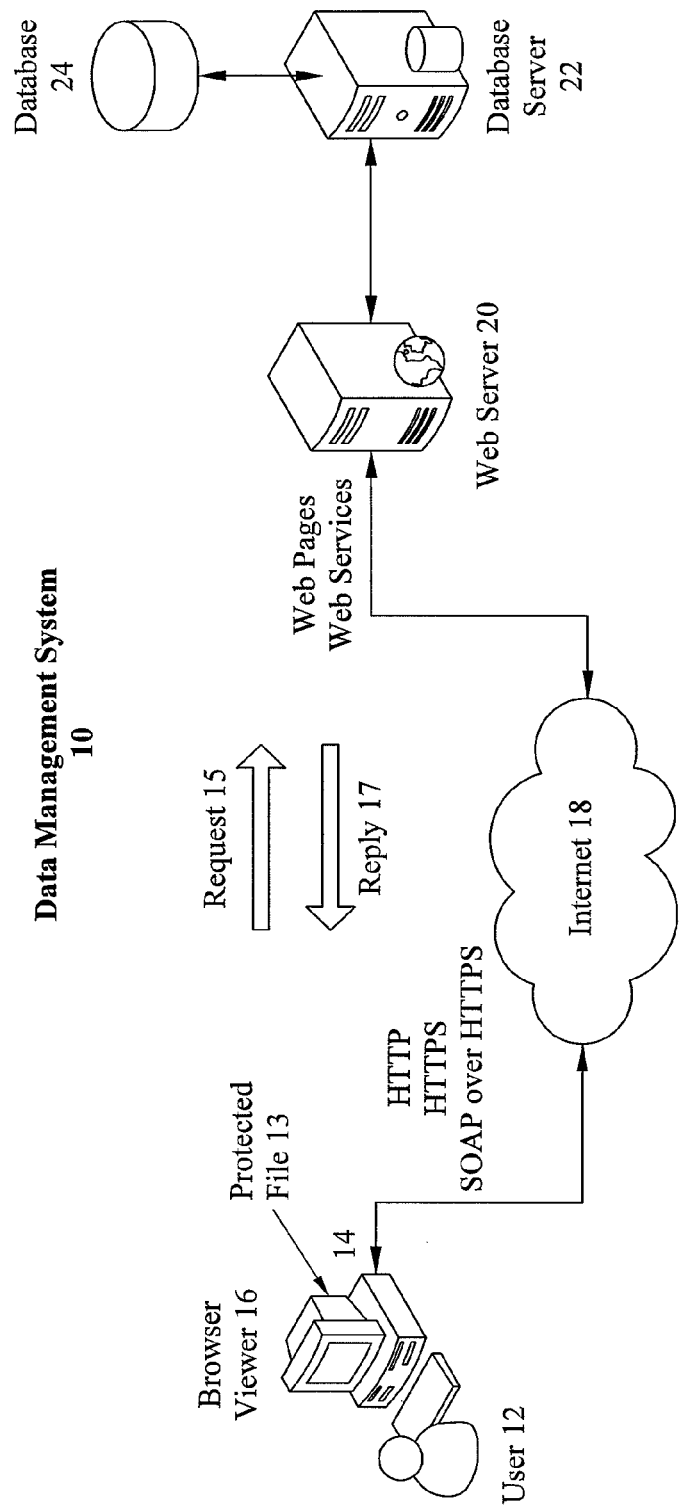
FIG. 1 is a block diagram illustrating an exemplary Data Management System environment.

The disclosed Data Management System supports digital asset protection when sending images, documents and other digital data or files over a network such as the Internet. The system provides the ability to limit access to digital assets—such as digital media—by authorized users. This bi-directional flow of data is between the creator/content author and the intended or authorized user to whom the data creator has provided a time-sensitive pass code. This allows the data management system to provide to the creator, the individual consumer or the corporate executive, an inexpensive way to manage, as well as to track, Internet users who have access to the creator's digital images and documents. As an example, the creator may find it interesting to see who has viewed his profile on a dating site, but this same ability to monitor who has viewed the creator's digital media may become critical when critical records, such as his electronic Medical Records, are being accessed and possibly altered. In addition, the Data Management System can control the use of, and track data related to, digital media and other digital assets.

The Data Management System may secure, track, report use and attempted use of secured data and permit a creator to call back digital data that has been sent out over the Internet so that further access or editing may be prevented.

The asset manager is the core engine that operates the Data Management System. The creator can initiate the Data Management System process and become the owner and distributor of the digital content which has been secured by Data Management System. The creator may pay the operators of the Data Management System directly to protect his data or he may allow a sponsor to advertise directly on his personally created content. The creator has the option to allow advertisement on his images, videos, and press releases so as to have a sponsor pay the cost of the creator's use of the Data Management System.

The Data Management System Viewer provides the user-viewer with an opportunity to interact with and make spelling or other changes to an original document or other data file from within in a unique writing box or other editor. These changes are made within the Data Management System Viewer and are appended to the document, along with a time and date stamp, to create a record of who has accessed and/or changed the data without altering the original document or file. Data Management System documents cannot be printed unless the command is authorized by the creator to the viewer. Changes made to a Data Management System document by a viewer travel with the document until the content owner decides to incorporate the changes or file them in the writing file.

The Data Management System document is copy protected and can mirror other formats, such as Adobe or Word, but the changes made to a Data Management System asset stay within the Data Management System. Author-credited changes or edits can be called up by the creator to prove actual work and authorship origination. Data Management System supports a system of Digital Data management uses as well as security hardened data file management to prevent unauthorized changes to be made, for example, in medical records.

The Data Management System asset manager may wrap digital assets in a layer of security which may be scaleable at many levels. For example, at one level of security, this wrap enables a safe transfer of assets between two users. At a higher level of security, the Data Management System manager validates access permissions and availability to users and viewers. Data Management System data has a specific window of time within which it may be viewed before it times out and becomes inaccessible to the viewer. The Data Management System manager may rapidly determine whether a user has permission, or the availability to view documents/images.

At yet a higher level of security, images of the protected digital assets may be represented as an obscured photo, for example where only the outline of the image is discernable. At a still higher level of security, the image or document may have a visible header, e.g. the subject matter in a press release or a pile of sand in an image. At various high security levels, the Data Management System may block unauthorized users from viewing protected digital assets, and may also track the IP, the MAC address and/or the hardware machine name of a user or other person attempting to access the digital asset. A time stamp may be used to identify those who attempt to gain access to a protected asset and adds information to the exchange as metadata stored within the asset. This metadata can be tracked, is reportable and traceable down to a word, pixel, region, contour, sequence or pattern.

An asset may be any digital file. These digital files are layered with multiple security level options. The content owner may chose to differentiate their personally created content from other files, such as adult files or regular content files, by using different files extensions, such as a .dpx file extension. Assets may be evaluated for Adult content or other specified content or imagery and automatically placed into a particular file format. Adult or other controlled files in a specific format, such as the .dpx file format, may not be converted to regular files, e.g. those in the .dpt file format.

The Data Management System may use AES encryption to allow digital data, such as images and videos, to be protected and shared with intended recipients as well as reworked in flight or away from a network connection with offline functionality. A user may use the Data Management System CODEC to secure digital data. The Data Management System CODEC may be data agnostic, allowing the user to control any digital asset, for example, allowing the asset to be controlled by the author or creator.

Figure 3:
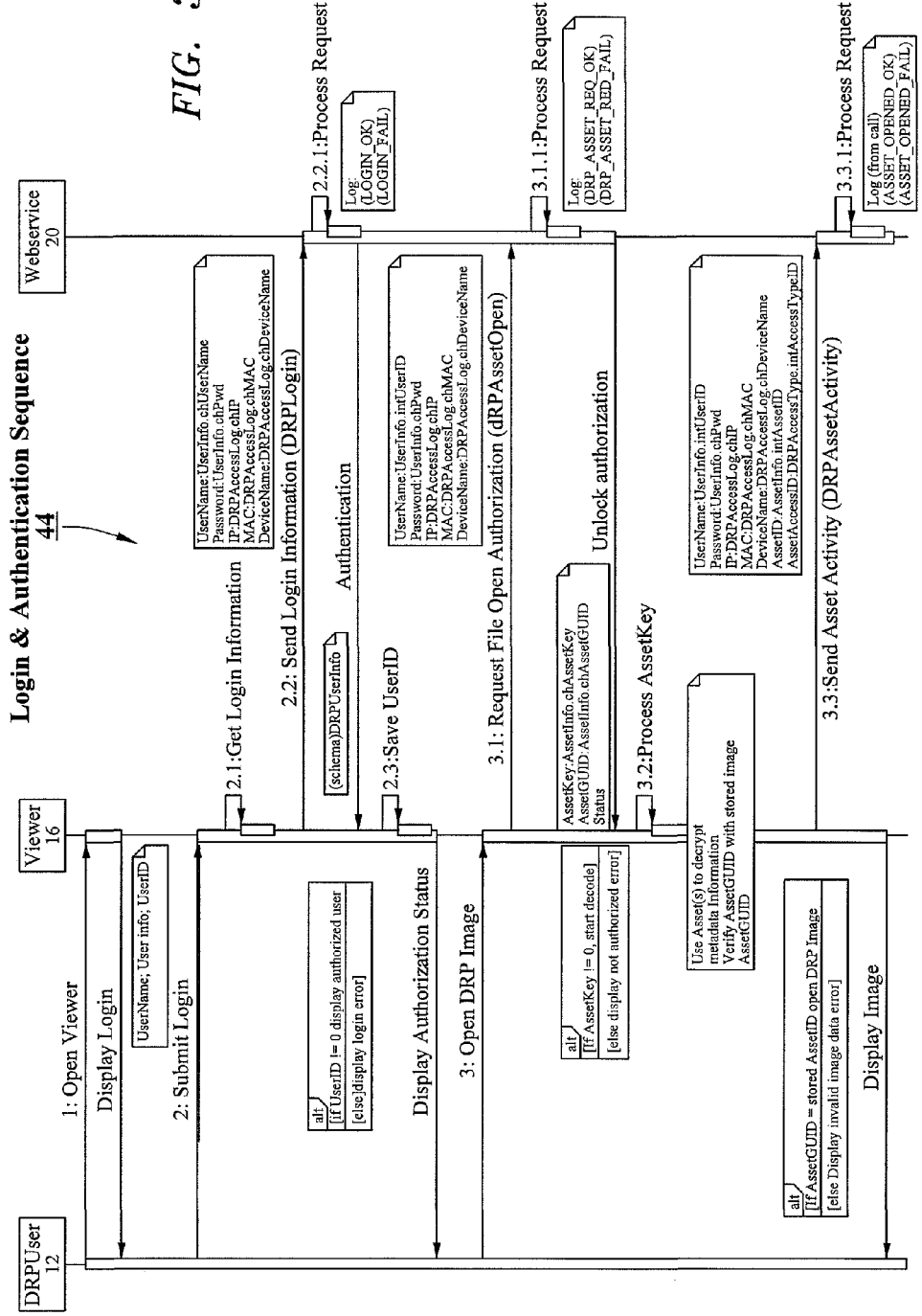
FIG. 3 is a block diagram illustrating details of a log in and authentication sequence.
Figure 5:
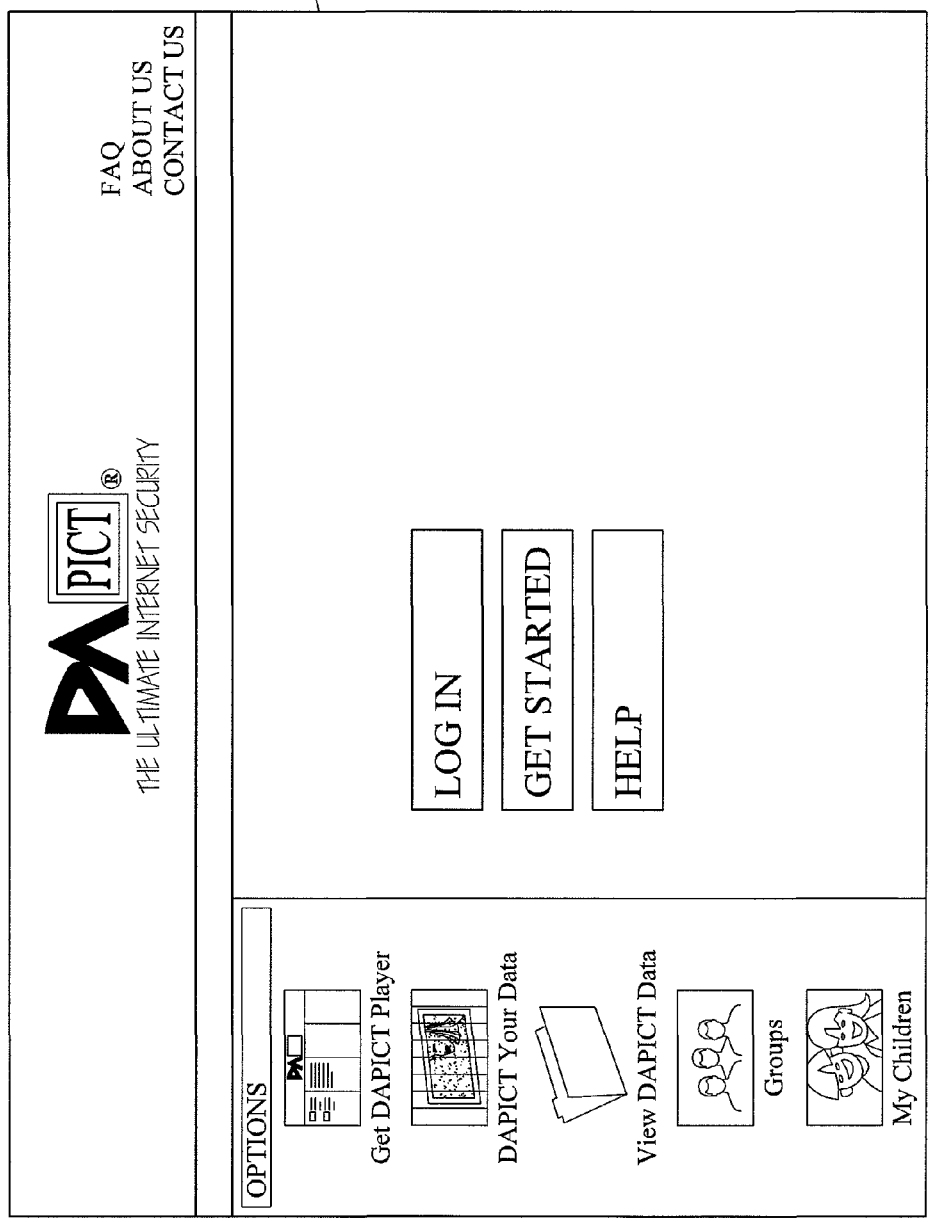
FIG. 5 is a rendering of a screen shot of a Data Management System web login screen.

In operation, the owner or creator of digital asset content may be directed to the Data Management System's Web site and instructed to log in, see FIGS. 3 and 5.

During a first visit to the Data Management System Web site, the user may be taken to a Registration Page for a verification of relevant data such as identity, age, and funds, and be required to review and accept the Web site's user Agreement. After having provided the required information, the user may select the types of features and digital files he will process using the Data Management System. Information provided by the user may be processed using high level unique algorithms and other processes which include HTTP, HTTPS, and SOAP over HTTPS and the like. The Data Management System CODEC utilizes algorithms that may combine byte encoding and multiple key AES encryption.

The Data Management System CODEC enables the graphical users interface, or GUI, to encapsulate a wide variety of formats such as .jpg, .tif, .raw, .bmp, .pict, .tarr, .png..avi, .cdr, .cms, .gif, .img, .pcx, .pov, .ppm, .ps, .tga, .xbm, and the like as well as system files such as .dpt and .dpx. The CODEC may process a wide variety of file types such as Video Files, Audio Files, Faxable Files, Word Documents, MP3 Files, Data Streams created from Texting Sources, executable file formats such as Apple Documents as well as many other data file types.

The Data Management System allows transactions to be stored in an offline file and to be transmitted when reconnected. A browser is used to access the web and browse files and other code. A CODEC uses one or more algorithms to embed the digital asset in a Data Management System file. The techniques used may include combining byte encoding, AES encryption and are agnostic to file type.

A stand alone asset viewer may be used to view system files. The system file structure may include a viewable header while the body of the file is obscured. Viewing of the body of the file can be enabled by associated security rules. The protected file may have a specific file type, a unique ID, encrypted information and non-encrypted metadata. The original data file may be embedded in a transport file such as .jpg and may include image and other data which is encrypted and/or has been processed by bit manipulation.

Figure 14:
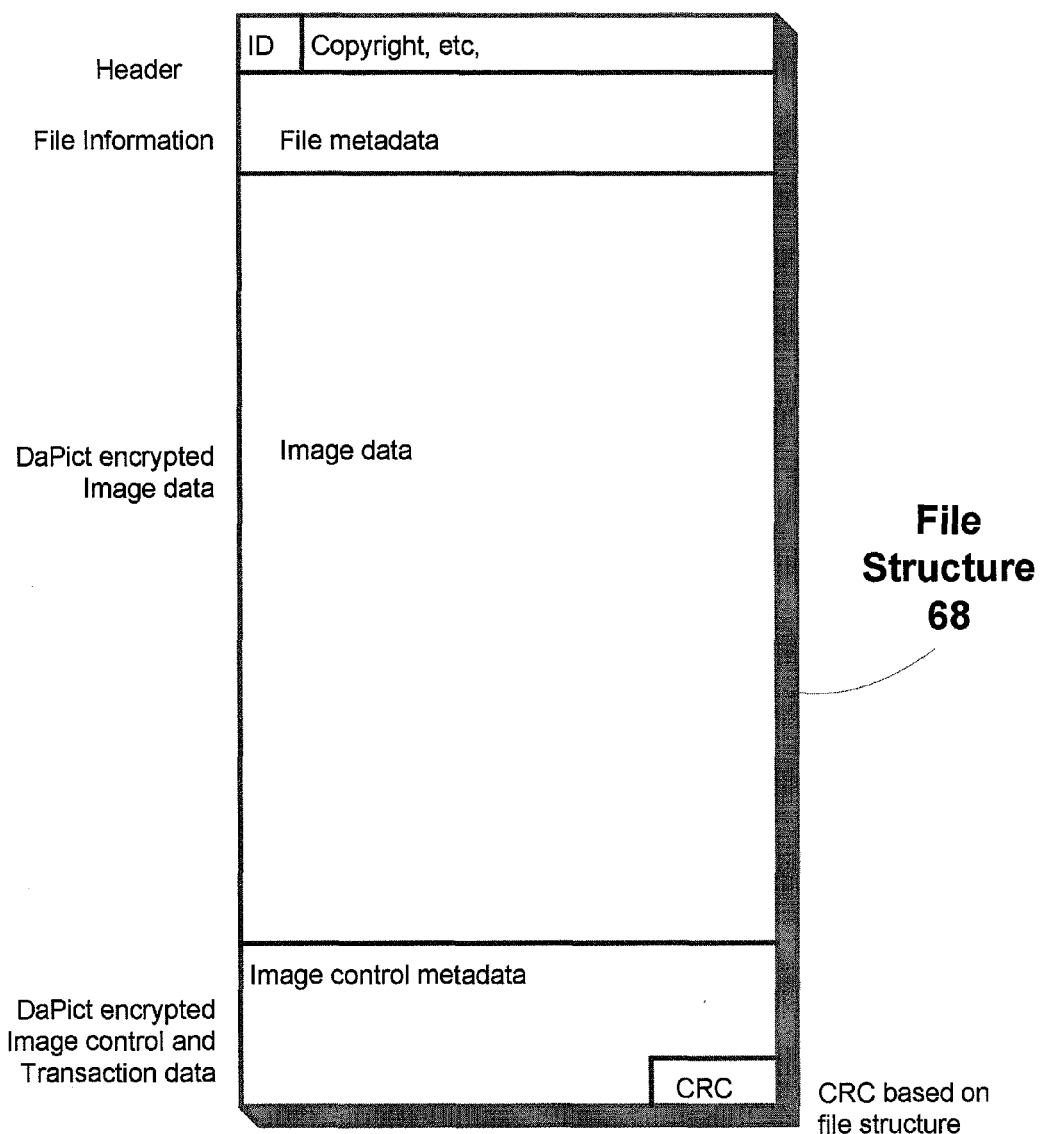
FIG. 14 is a block diagram of a file structure for wrapping digital assets, according to various embodiments.

The Data Management System file structure, illustrated in FIG. 14, is the security wrapper around the asset to be protected. The file structure includes both open and protected information about the file as well as information on how to decode the asset. The asset may be encoded, encrypted, and/or embedded in the file. The file structure may be configured to store transaction information for offline viewing and/or uploading to a Data Management System server, e.g., when the user comes back online.

Data Management System files may contain an optional Indelible Watermark, viewable as a proprietary Data Management System icon.

Restrictions and security imposed by the content owner may include a limited time to view and a specified time for retiring the content, that is, a specified time after which the content cannot be viewed even if the viewer is otherwise authorized. A partial view of the file, e.g. an outline of a picture, may be shown to the general public when the digital file has not been opened with a Data Management System viewer. The image could mimic a JPG type file which an interested party may open only if authorized. Documents, for example a press release, may provide the recipient further information if they are authorized as a viewer. If the creator of the press release sent out a blanket e-mailing of the press release and would like to check to see who has opened and read the document, the partial view becomes a complete view and the creator is now aware who is reading or potentially interested in their information.

The timed out feature, for example, may be used for press releases, real estate contracts and other time sensitive documents. Any data the creator would like worked on, commented on or is time sensitive can be "timed out" at any point by the creator, even if the document is in the viewer's "permissions folder". The creator may have a key which shows where all of his protected digital assets are, as well as the recipients, and permissions and restrictions of a content agnostic document, digital file, image or other digital asset.

The obscured view of a protected image or other digital asset may be used for a corporation to sponsor the protection system and may be obscured for security reasons. When viewed through the viewer, the logo and sponsored image may step aside for the data file. A specific icon, such as a pile of sand may indicate a security breach and/or attempt to view an item without proper authorization. A randomized pass code, may be used at the highest level of security to prompt viewers to re-enter their code, assuring that the person reading or making the changes is authorized. Parental control enablers may also be used to require a parent or other authorized person to enter a proper authorization even if the file is be used by another.

A bi-directional on/off control may be used to allow the creator of the protected digital asset to allow or not allow viewing of the asset by switching on/off viewer rights at the server. A private key access from the creator may provide a higher capacity download and a faster encrypt/decrypt process.

The Data Management System may track user data, time logged on, time viewed, what files were processed and by whom. This tracking system may provide a chain of custody to manage digital content. The Data Management System may report use data to a viewer, a user or a corporate sponsor.

When the Data Management Systems protects a digital asset, the server may generate a unique and permanent asset ID number that is embedded in the protected file. Additional data added to a protected file may be searchable metadata. Other added data may include information about user, viewer, permissions, restrictions, IP address, computer name, location, time, changes appended to document, key strokes, whether data was created or changed on-line in real time or via offline functionality, age bracket of user or viewer or their sex or physical or geographic location, the user's on-line viewing patterns or favorite sites.

Metadata original may be embedded into watermark and/or the viewer or user may be able to select to "opt out" of leaving an electronic trail. The watermark indicator may be visible or invisible and may be positioned at the bottom of the protected file.

A viewer may be authorized to change make minor changes to a document, for example, to either add or change punctuation or add a different word on the creator's document. These comments may be permanently appended to document at the actual point of change and indicated by a small Data Management System or other icon. Alternately, the creator may give the viewer permission to interactively amend and or contribute to the protected document. Such changes may be made and captured inside the Data Management System database and track, date, sequence, spell check, check syntax, continuity, concepts, punctuation grammar and edit and organize these contributions for the creator to accept or reject. In the Data Management System, these changes may appear as three dimensional overlays.

The protected digital asset file may be copy protected using a control print to capture and defeat the print screen feature. A system feature may be constantly scanned for hackers and other security breaches. A file with a specific extension, such as .dpd, may indicate the final accepted and edited document designated with it's own format. Each time data is opened, it may be re-validated in order to provide access permissions to the viewer. Further, the system may check each time to determine if the authorized time has timed out and whether or not the permissions or authorizations have changed.

Referring now to FIG. 1, Data Management System 10 may provide access for user 12 to a protected file on computer 14 via browser viewer 16 which may be downloaded by known protocols, such as HTTP, HTTPS or SOAP over HTTPS, via Internet 18 and web server 20 from database server 22 in accordance with the contents of database 24.

In operation, user 12 may have received encrypted file 13, stored in computer 14, together with information directing user 12 to web server 20. At Web server 20, user 12 engages in a log in procedure which, if successful, allows user 12 to download viewer 16 in computer 14. When user 12 attempts to utilize viewer 16 to view—or otherwise access—encrypted file 13, viewer 16 sends request 15 to database server 22 via a web server, such as server 20. Request 15 may be encrypted and/or byte manipulated or otherwise limited, and include a user 12 ID, a protected file 13 ID, a timestamp and possibility other data related to file 13. Database server 22 decrypts request 15, checks for proper authorization for the requested access to protected file 13 by user 12 including limitations related to time, and if authorization is appropriate, sends encrypted authorization key 17 back to computer 14.

Encrypted authorization key 17 may include the actual decryption key or information from which the key may be generated by viewer 16 as well as data related to protected file 13 and/or user 12. Viewer 16 decrypts authorization key 17, perhaps by use of data in file 14 and decryption key 17 to provide access by user 12 to file 14. File 14 may not be decrypted but rather viewer 16 is enabled by decrypted authorization key 17 to allow user 12 to view or otherwise access file 14 in accordance with authorizations provided in database 24 for user 12 with regard to file 14.

Figure 2:
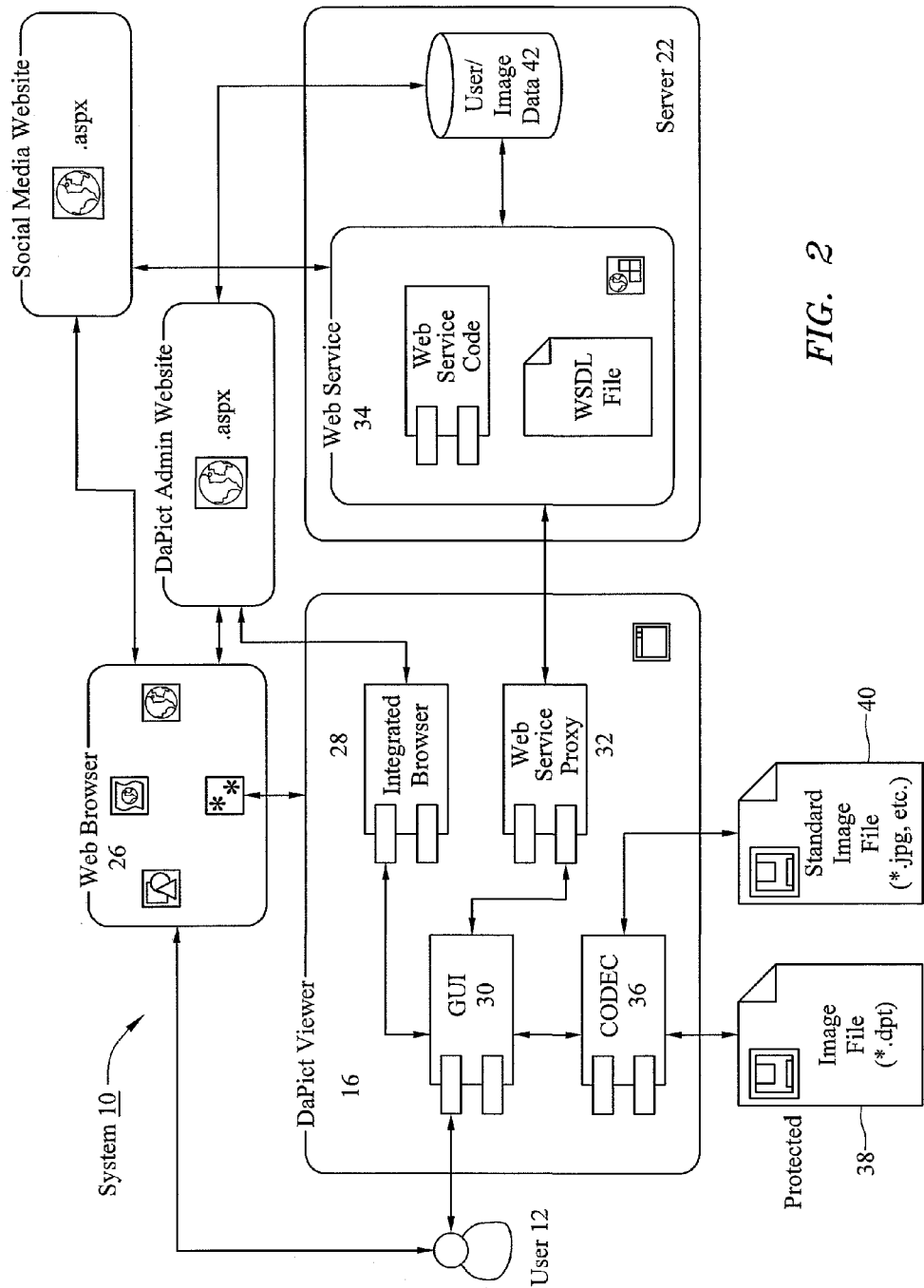
FIG. 2 is a block diagram illustrating details of a Data Management System viewer communications.

Referring now to FIG. 2, user 12 may use web server 26 to interact with server 22 in order to download viewer 16 in a computer operated by user 12. Viewer 16 may include integrated browser 28 for ongoing interaction with server 22 in response to interaction between user 12 and GUI 30. Web service proxy 32 may be used to interact with Web service 34 in server 22. Web service code generator 34 may provide the protected file, and/or viewer 16, to user 12.

CODEC 36, in viewer 16, when properly authorized by interaction with server 22, may decrypt or at least render viewable protected file 38 in the form of a standard file 40, such as an image file. Information regarding the requirements for user 12 obtain viewer 16, and the various permissions, authorization and/or limitations to be applied to any access by user 12 to the protected data in protected file 38 are stored in database 42.

Referring now to FIG. 3, a block diagram illustrates the details of log in and authentication sequence 44 in which user 12 uses viewer 16 to obtain access to display an image in a protected file. User 12 opens viewer 16 which causes a login screen to be displayed. User 12 causes the login information to be retrieved and forwarded to web service 20. If successful, authentication is provided by web service 20 via viewer 16 to user 12. Once logged in, user 12 may request display of an image from a protected file. This request is passed by view 16 to service 20 which processes the request and if successful, provides an unlock authorization which may be in the form of an asset key, to viewer 16. Using the asset key, viewer 16 begins the process of decrypting the protected file in order to display the desired image to user 16.

Figure 4:
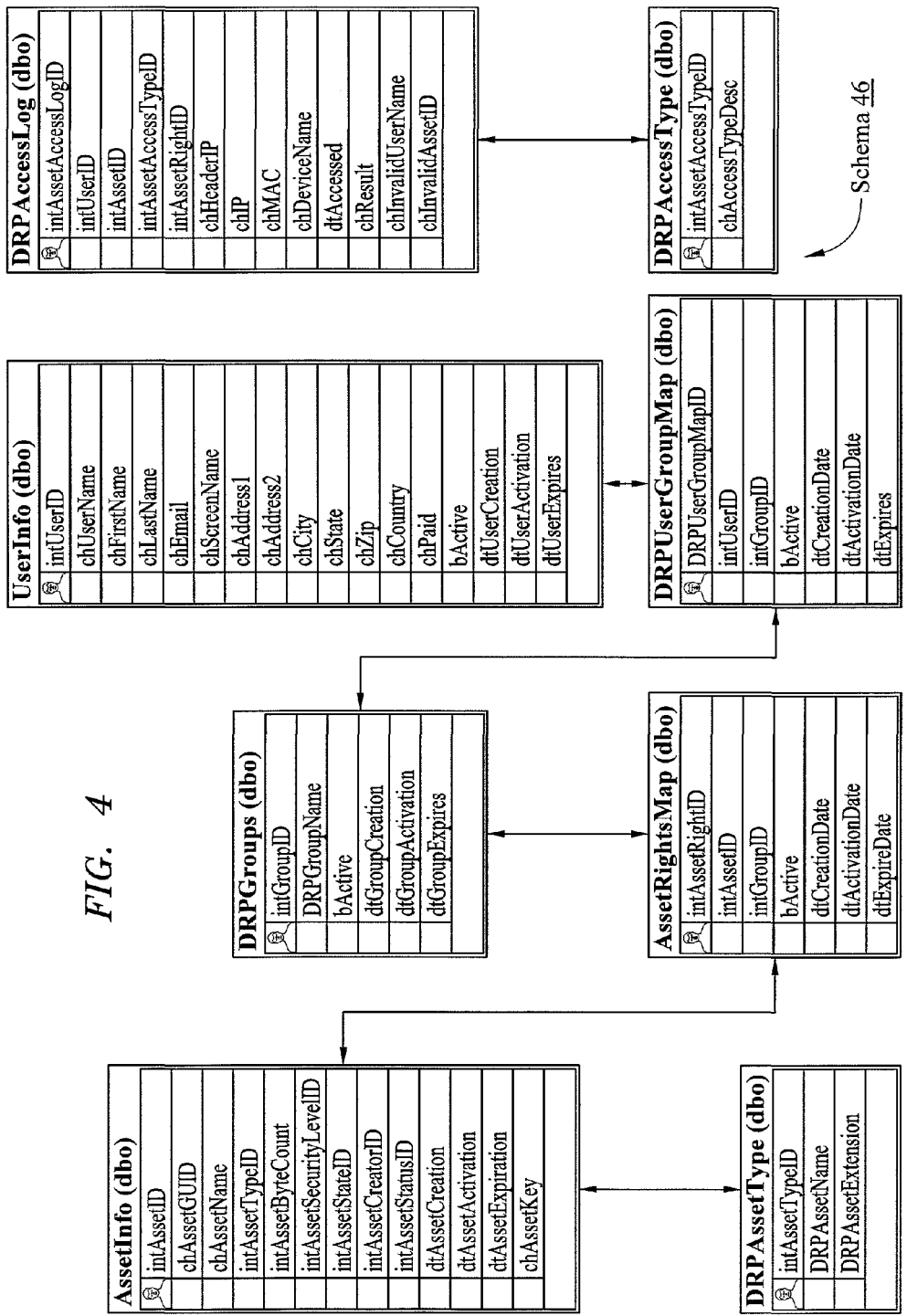
FIG. 4 is a block diagram illustrating details of a database schema.

Referring now to FIG. 4, an illustrative database schema 46 is outlined. Schema 46 shows the relationships between assets/groups/users in one embodiment to achieve control and tracking of a digital asset.

Referring now to FIG. 5, screen shot 48 of a Data Management System web login screen is shown.

Figure 6:
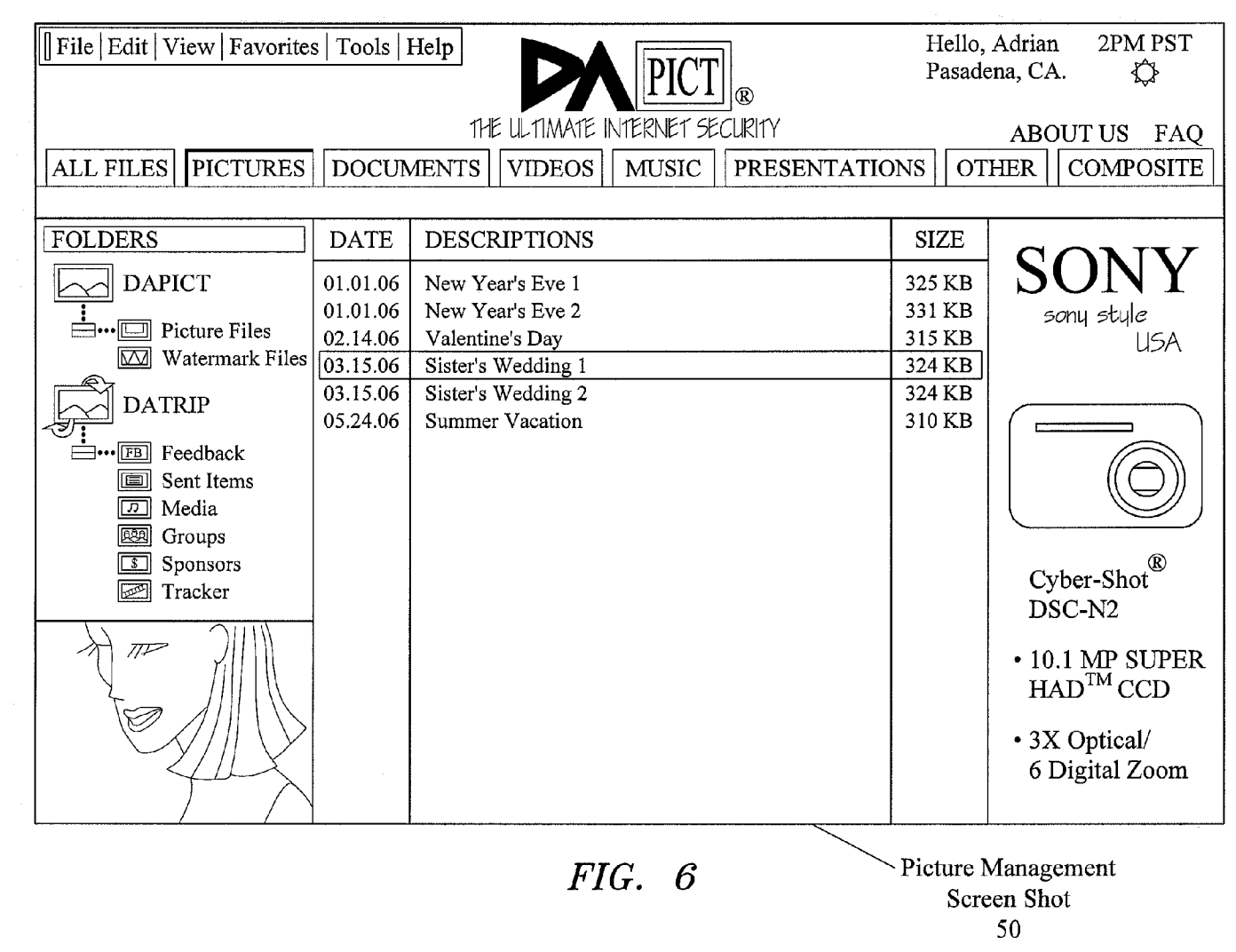

Referring now to FIG. 6, screen shot 50 of a web picture management screen for user 12 is shown.

Figure 7:
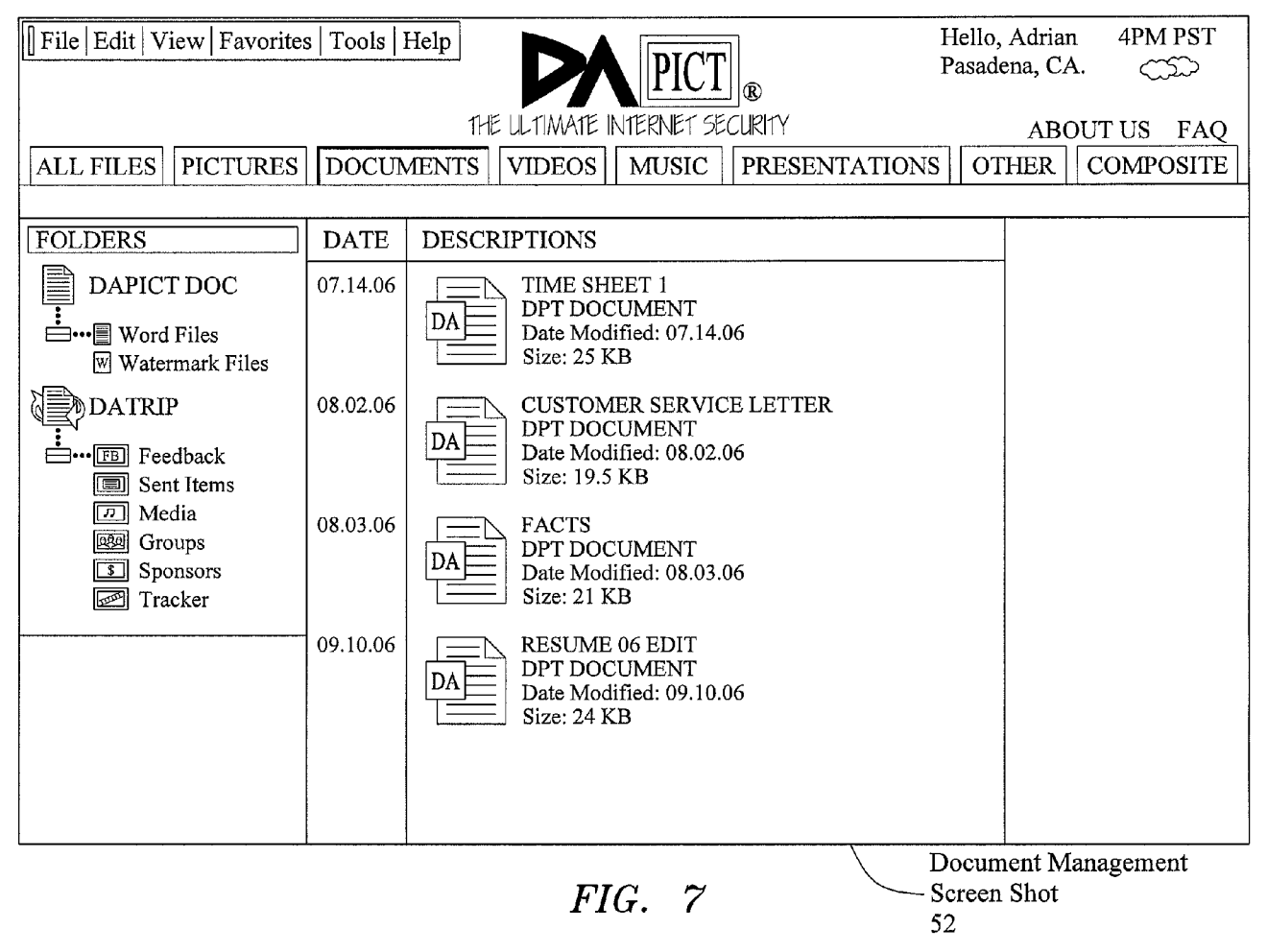

Referring now to FIG. 7, screen shot 52 of a web Data Management System user's document management screen is shown.

Figure 8:
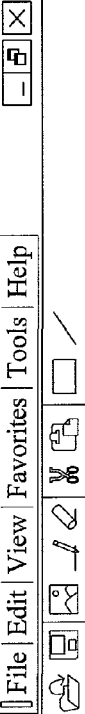
FIG. 8 is a rendering of screen shot web asset management screen.

Referring now to FIG. 8, screen shot 54 of a web asset management screen is shown.

Figure 9:
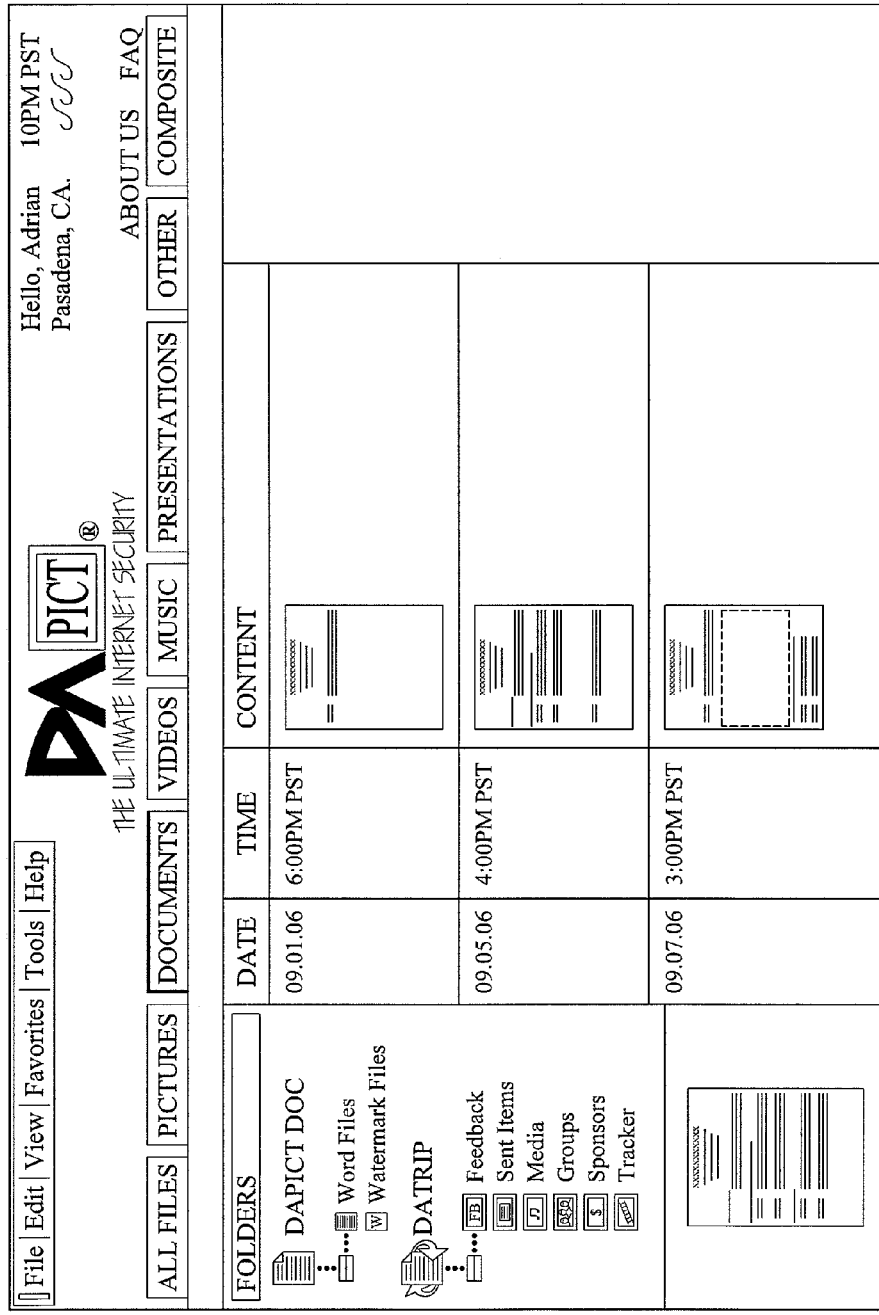
FIG. 9 is a rendering of screen shot of a Data Management System web user's document detail management screen.

Referring now FIG. 9, screen shot 56 of a document detail management screen for user 12 is shown.

Figure 10:
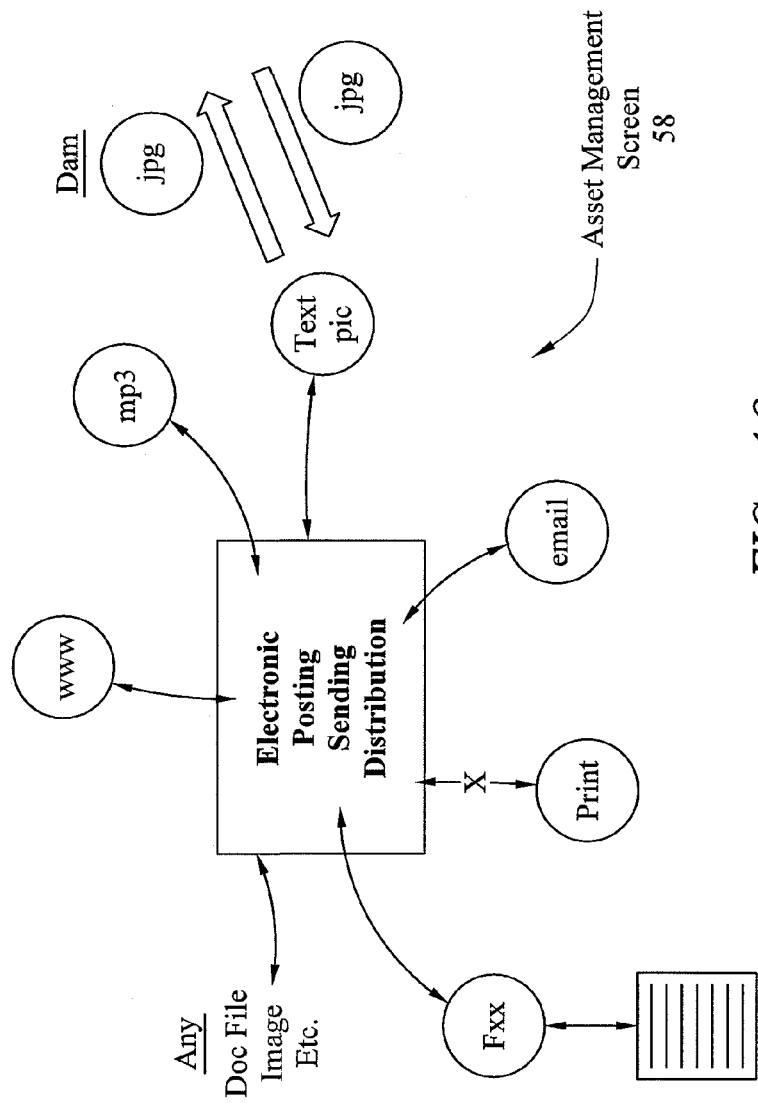
FIG. 10 is a block diagram illustrating details of a Data Management System asset management application.

Referring now FIG. 10, details of a web Data Management System asset management application 58 are shown.

Figure 11:
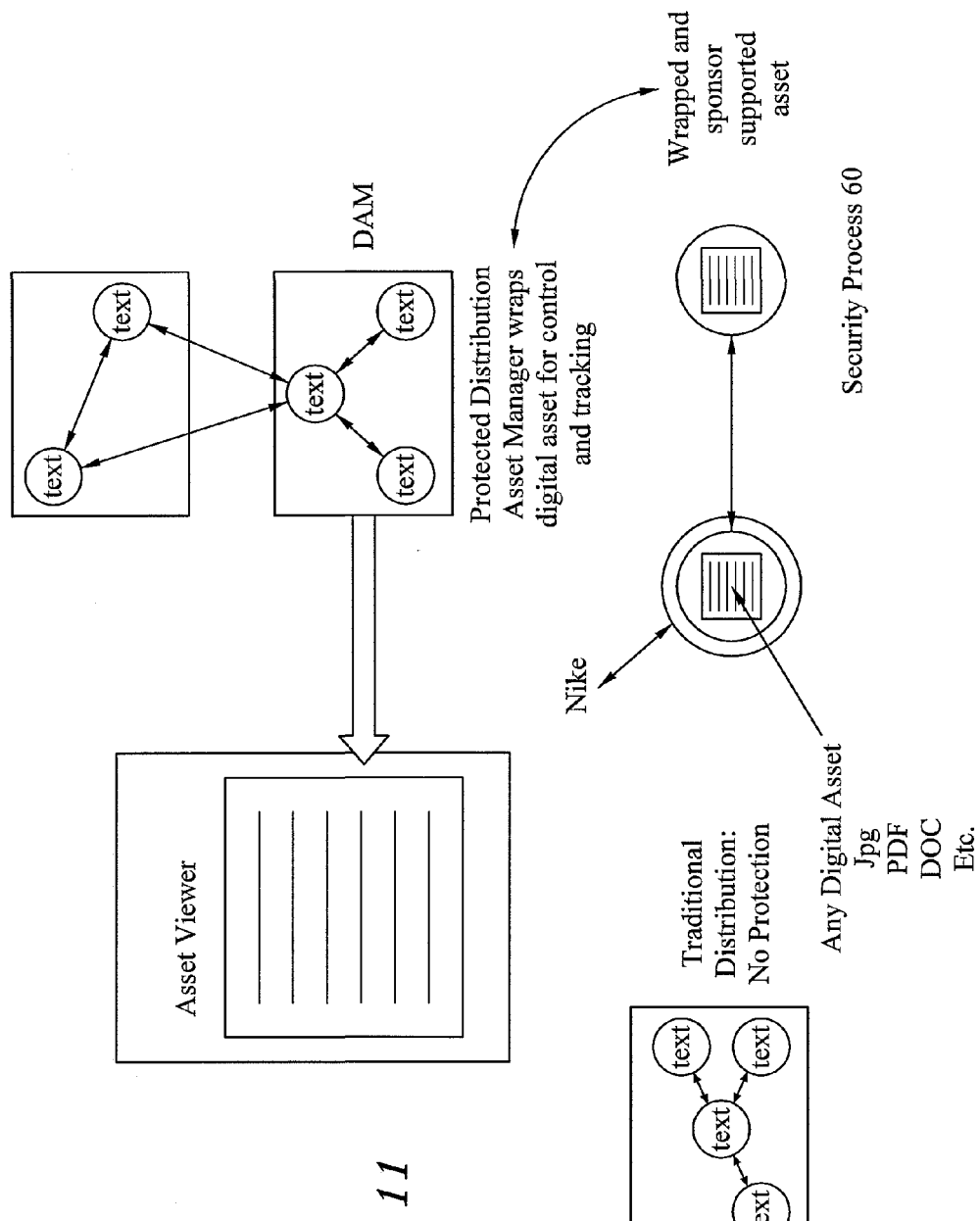
FIG. 11 is a block diagram illustrating details of Data Management System security processes.

Referring now to FIG. 11, details of Data Management System security processes 60 are shown.

Referring now to FIG. 12, exemplary user report 62 is shown.

Figure 13B:
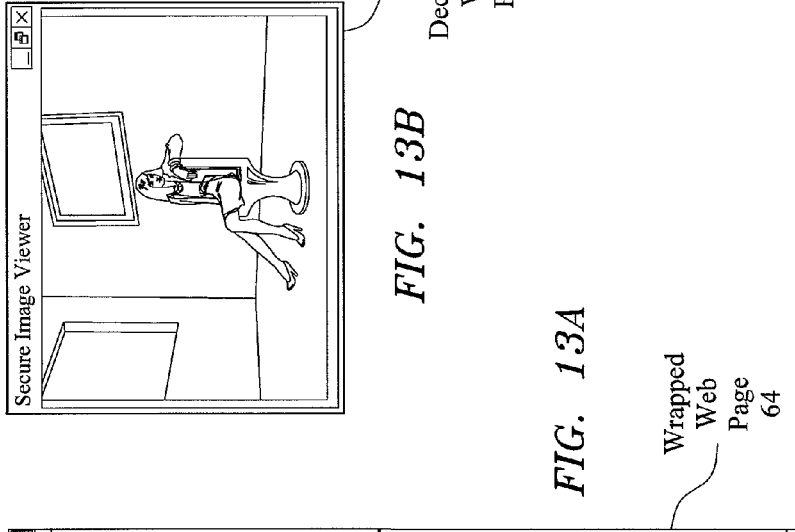
FIG. 13B is screen shot of an image from the Data Management System wrapped social network web page of FIG. 13A.
Figure 13A:
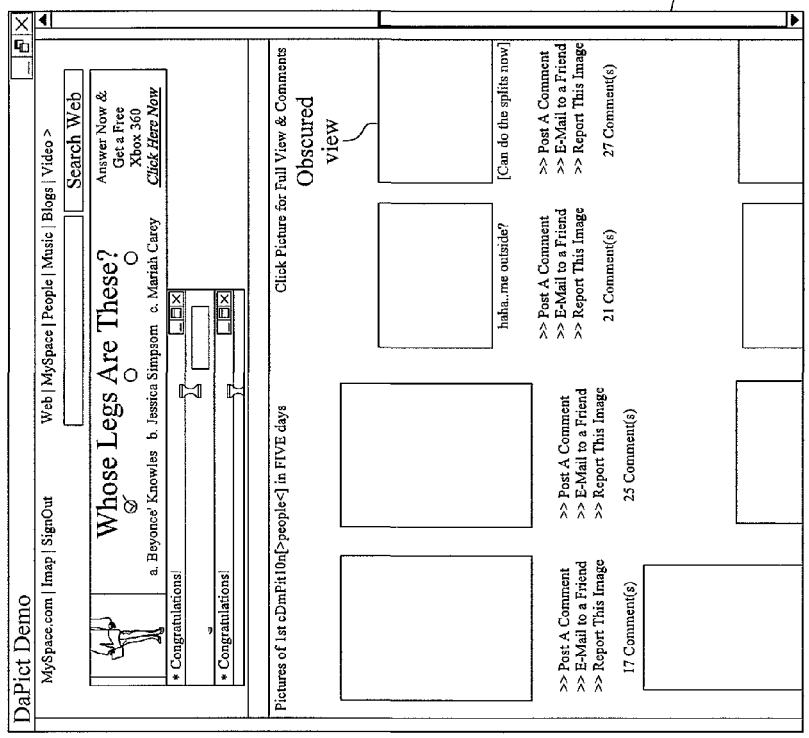
FIG. 13A is screen shot of a Data Management System wrapped social network web page.

Referring now to FIG. 13A, screen shot 64 of a Data Management System wrapped social network web page is shown.

Referring now to FIG. 13B, screen shot of an image 66 from the Data Management System wrapped social network web page of FIG. 13A is shown decrypted.

Referring now to FIG. 14, file structure 68 for wrapping digital assets is shown.

What is claimed is:

1. A method for controlling remote access to a digital asset, comprising:

protecting a digital asset in a protected digital asset file, said digital asset file containing the digital asset and a unique security wrapper, said unique security wrapper comprising open and protected information about the asset and asset decoding data for a particular copy of the digital asset;

providing, on a remote computer system, a remote database, said remote database including a user identification, a digital asset file identification, a temporal specification, an access definition, and an access control for the digital asset file, said access control being set to one of a first state in which access is granted and a second state in which access is denied, and said temporal specification defining a temporal limitation for access to the digital asset, and said temporal specification and access control being settable and changeable by an administrator having access to the remote database; and at a first time, determining if the access control is set to the first state for the protected digital asset file; and if, at the first time, the access control is set to the first state for the protected digital asset file, then making the protected digital asset file, and a protected digital asset file viewer, available via network communication to a user on a user's computer, said remote database and remote computer being remote from the user's computer;

after the protected digital asset file and the protected digital asset file viewer are made available to the user on the user's computer, then each time the user attempts to interact with the protected digital asset file using the the protected digital asset file viewer, generating a request and communicating the request from the digital asset file viewer on the user's computer via network communication to the remote computer, said request including the user identification, the digital asset file identification, a timestamp and the protected information from the security wrapper;

after receipt of the request by the remote computer from the user's computer, determining from the remote database if the user is authorized to interact with the protected digital asset file as of the timestamp, based upon the corresponding temporal specification in the remote database as of the timestamp; and if, based upon the temporal specification, the user is authorized to interact with the protected digital asset file as of the timestamp, also determining from the access definition in the remote database a then-current extent to which that user is authorized to interact with the digital asset, and generating a key from the protected information of the security wrapper and providing the key to the protected digital asset file viewer on the user's computer, said key permitting the digital asset file viewer to decode the particular copy of the digital asset in accordance with the decoding data in the security wrapper and the user to interact with the protected digital asset on the user's computer only to the then-current extent authorized, without making an unprotected version of the protected digital asset available for use without the protected digital asset file viewer and the key.

2. The method for controlling remote access to a digital asset according to claim 1, wherein the step of providing the key to the protected digital asset file viewer on the user's computer permitting the digital asset file viewer to decode the particular copy of the digital asset in accordance with the decoding data in the security wrapper and the user to interact with the protected digital asset on the user's computer only to the then-current extent authorized further comprises:

providing keys to protected digital asset file viewers on each of a plurality of users' computers, and based upon the temporal specification in the remote database for each user identification, limiting a time period for permitted interaction with the protected digital asset on each user's computer in accordance with the specific authorizations for each user.

3. The method for controlling remote access to a digital asset according to claim 1, wherein the step of making the protected digital asset file and the protected digital asset file viewer available via network communication to the user on the user's computer further comprises:

making a first, limited view of the protected digital asset in the protected digital asset file available to the user on the user's computer; and thereafter making a second, more detailed view of the protected digital asset available to the user on the protected digital asset file viewer on the user's computer upon receipt of the key.

4. The method for controlling remote access to a digital asset according to claim 1, further comprising:

providing a data management system website; allowing a content administrator to log into the data management system website, upload metadata for a digital asset to be protected in a protected digital asset file and record authorizations for access to the digital asset for the user;

allowing the user to log into the data management system website to request authorization to interact with the protected digital asset; and allow the content administrator to review all subsequent requests for authorization to interact with the digital asset and selectively authorize the inclusion of proposed changes in the digital asset.

5. The method for controlling remote access to a digital asset according to claim 4 further comprising:

adding a link to the data management system website to the protected asset file metadata; and receiving the request via the link.

6. The method for controlling remote access to a digital asset according to claim 1, said temporal specification comprising a time limit, said time limit providing a time period from a start time to an end time for said user, said digital asset file viewer allowing the digital asset to be decoded and interacted with only within the time period.

7. The method for controlling remote access to a digital asset according to claim 6, said temporal specification comprising an end time, and said digital asset file viewer allowing the digital asset to be decoded and interacted with only until the end time.

8. The method for controlling remote access to a digital asset according to claim 1, said temporal specification comprising a duration limit, said duration limit providing a time duration for said user, said digital asset file viewer allowing the digital asset to be decoded and interacted with only for the time duration.

9. The method for controlling remote access to a digital asset according to claim 7, said extent to which the user is authorized to interact comprising a portion limit, said digital asset comprising a plurality of portions, said portion limit identifying certain of the plurality of portions with which the user is authorized to interact, said digital asset file viewer allowing the digital asset to be decoded and only the portions with which the user is authorized to interact to be interacted with.

10. The method for controlling remote access to a digital asset according to claim 1, said extent to which the user is authorized to interact comprising a portion limit, said digital asset comprising a plurality of portions, said portion limit identifying certain of the plurality of portions with which the user is authorized to interact, said digital asset file viewer allowing the digital asset to be decoded and only the portions with which the user is authorized to interact to be interacted with.

11. The method for controlling remote access to a digital asset according to claim 1, said extent to which the user is authorized to interact comprising annotating the digital asset, and said digital asset file viewer saving annotations associated with the digital asset.

12. The method for controlling remote access to a digital asset according to claim 1, said extent to which the user is authorized to interact comprising modifying the digital asset, and said digital asset file viewer saving the digital asset as modified.

13. The method for controlling remote access to a digital asset according to claim 1, said key being provided in encrypted form, and said protected digital asset file viewer decrypting said key as provided in encrypted form.

14. The method for controlling remote access to a digital asset according to claim 1, further comprising a step of preventing printing of the digital asset as made available for interaction by the digital asset file viewer.

15. The method for controlling remote access to a digital asset according to claim 1, further comprising a step of preventing screen capture of the digital asset as made available for interaction by the digital asset file viewer.

16. The method for controlling remote access to a digital asset according to claim 1, further comprising a step of preventing copying of the digital asset as made available for interaction by the digital asset file viewer.

* * * * *